(12) United States Patent
Glass

(10) Patent No.: US 8,806,952 B1
(45) Date of Patent: Aug. 19, 2014

(54) MEASURING SPORTS NET TENSION

(76) Inventor: David Ewing Glass, Knoxville, TN (US)

( * ) Notice: Subject to any disclaimer, the term of this patent is extended or adjusted under 35 U.S.C. 154(b) by 134 days.

(21) Appl. No.: 13/549,513

(22) Filed: Jul. 15, 2012

Related U.S. Application Data

(60) Provisional application No. 61/507,854, filed on Jul. 14, 2011.

(51) Int. Cl.
*G01N 3/08* (2006.01)

(52) U.S. Cl.
USPC .............................................. 73/826; 177/232

(58) Field of Classification Search
CPC .......... G01L 1/042; G01L 1/046; G01G 3/02; G01G 3/06
USPC ............... 73/760, 828, 831; 177/232
See application file for complete search history.

(56) References Cited

U.S. PATENT DOCUMENTS

| | | | | |
|---|---|---|---|---|
| 3,824,847 A | * | 7/1974 | Chambers | 73/132 |
| 5,691,510 A | * | 11/1997 | Turman | 177/225 |
| 6,246,017 B1 | * | 6/2001 | Yang | 177/148 |
| 6,248,030 B1 | | 6/2001 | Pierce | |
| 6,766,698 B1 | * | 7/2004 | Robinson et al. | 73/856 |
| 6,945,471 B2 | * | 9/2005 | McKenzie et al. | 239/237 |
| 7,009,120 B2 | * | 3/2006 | Lee | 177/232 |
| 7,165,295 B2 | * | 1/2007 | DeWitt et al. | 24/132 WL |
| 7,717,877 B2 | * | 5/2010 | Lavi et al. | 604/137 |
| 7,823,466 B2 | * | 11/2010 | Glass | 73/862.392 |

* cited by examiner

Primary Examiner — Max Noori

(57) ABSTRACT

In one aspect, an apparatus for measuring a tension force on a net cord of a sports net is disclosed. The apparatus may include a housing configured to connect to a static post. The apparatus may also include a slidable member and attachment members. The attachment members may be configured to engage a portion of the net cord. A resilient member inside the housing may be connected to the slidable member, and an indicator member may be connected to the slidable member within the housing. The slidable member may be configured to move within the housing in response to and by a distance proportional to an amount of tension force on the net cord. The indicator member may be connected to the slidable member such that a portion of the indicator member may be exposed through a slotted opening defined in the housing.

19 Claims, 13 Drawing Sheets

US 8,806,952 B1

MEASURING SPORTS NET TENSION

CROSS-REFERENCE TO RELATED PATENT APPLICATION

This application claims the benefit, pursuant to 35 U.S.C. §119(e), of U.S. Provisional Patent Application Ser. No. 61/507,854, filed Jul. 14, 2011, entitled "Device and Method for Indicating Tension of Support Cables in Sports Nets" by David E. Glass, which is hereby incorporated by reference in its entirety.

BACKGROUND

Several games and sports that involve game-specific balls or projectiles use nets or netting to divide one participant or team from the other. Popular examples include tennis in its various forms, volleyball, and table tennis. Each of the courts or playing surfaces for these games includes a net terminated by standards or posts at each end, with a support cable or cord inside a headband atop a mesh or fabric netting, for the purpose of establishing the topmost boundary of the dividing net. Typically, this cable or cord has a fixed loop at one end, to attach to the support post by means of a hook, bolt, or other protruding anchor point.

The tension applied to this cable or cord (commonly referred to as the "net cord") has a significant effect on the playability of the net, in the way the ball is deflected when it strikes the net cord during play. As examples, in tennis and table tennis, a ball that strikes the net cord when "served" may stay within the field of play and be re-served. A net cord with too little tension may absorb the kinetic energy of the ball, resulting in a soft falling of the ball to the playing surface, while a net cord that is too tight can deflect the ball higher from the playing surface, causing it to fly past the playing surface boundary or targeted area or to bounce high into the air making an easy shot for the opposite player.

If the net tension on courts at a common facility vary unpredictably from court to court, players may be uncertain how a ball may react if it strikes the net cord. Furthermore, if the net cable is pulled too tightly, the net, net posts and footings may be damaged. For instance, over-tension on the net cable may result in cracks in the courts and damage to net post foundations, necessitating repairs that can cost thousands of dollars and result in down court time. Regulatory bodies of the above-mentioned and other games have indicated the desire to have all playing courts play equally, whether the playing surface friction and dimension, and response of ball strikes on net cords.

It is with respect to these and other considerations that the various aspects and exemplary embodiments are presented below.

SUMMARY

In one aspect, the present disclosure relates to an apparatus for accurately indicating the tension on a sports net cable, also referred to herein as a net cord. According to one or more embodiments, by using a compressible, resilient member such as a compression spring housed within a largely square or cylindrical housing, the tensile force of a net cable is transmitted by mechanical interface through a measurement section of the apparatus to the opposite end of the resilient member, which compresses in an amount proportional to the tensile force applied to the net cable. The housing is largely adjacent to and parallel to a static support post for the sports net and retained to the support post by a lower loop that connects the device to a hook affixed to the support post, or by fasteners that directly attach the housing to the support post. The housing is configured with a slotted opening, upon which a flat indicator member may be viewed for referencing the compression of the resilient member against a scale of marks placed on the housing such as to indicate, by comparison to the flat indicator, the tension force on the net cable.

These and other features will be apparent from a reading of the following detailed description and a review of the associated drawings.

BRIEF DESCRIPTION OF THE DRAWINGS

The accompanying drawings illustrate one or more embodiments of the disclosure and, together with the written description, serve to explain aspects of the disclosure. Wherever possible, the same reference numbers are used throughout the drawings to refer to the same or like elements of an embodiment, and wherein.

DETAILED DESCRIPTION

Figure 1A:
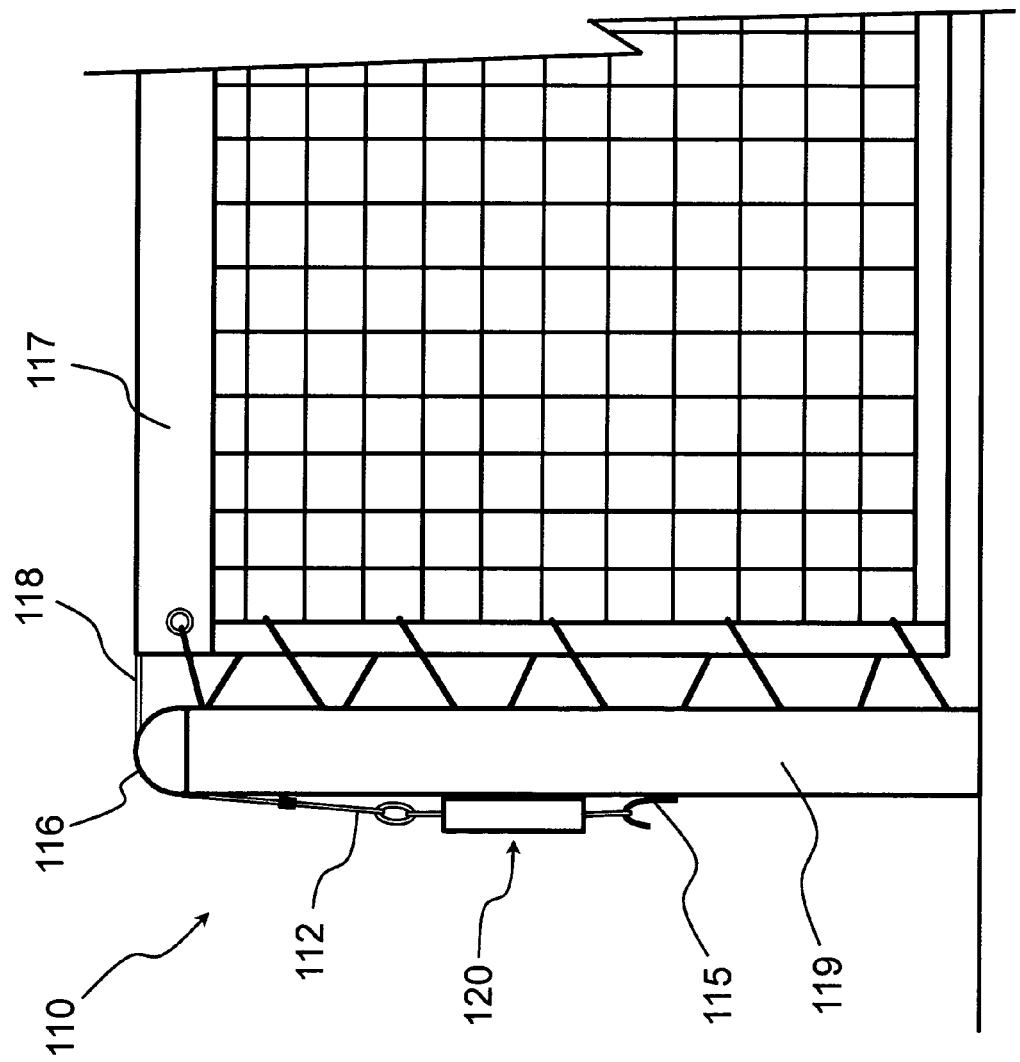
FIG. 1A provides a partial, plan view of a sports net system which includes an apparatus according to an example embodiment of the present disclosure, a sports net, and a support post.

In the following detailed description, references are made to the accompanying drawings that form a part hereof, which illustrate specific embodiments or examples. Referring now to the drawings, aspects of the various implementations provided herein and an exemplary operating environment will be described. The terms used in this specification generally have their ordinary meanings in the art, within the context of the disclosure, and in the specific context where each term is used. The first digit of each element numeral represents the first reference to the element in correspondence to the figure number of the several figures.

Figure 1B:
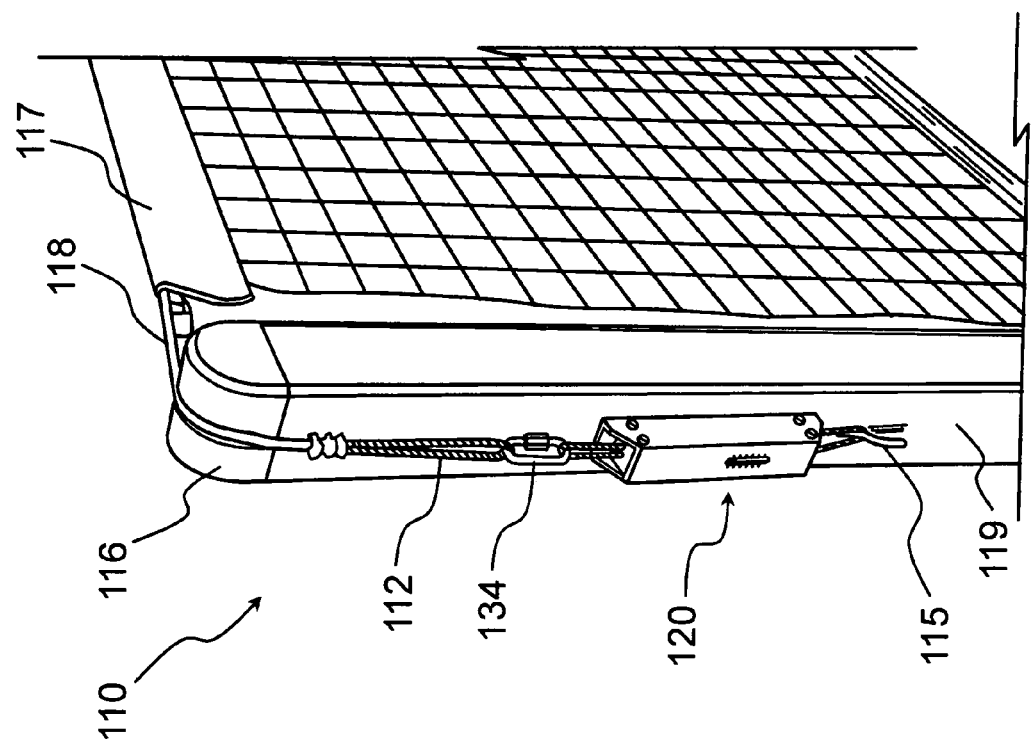
FIG. 1B schematically shows a view of the sports net system of FIG. 1A.

In various aspects, the present disclosure relates to apparatuses for indicating a tension force on a support cable for a sports net. FIG. 1A and FIG. 1B illustrates a sports net system 110 including an apparatus 120 according to one example embodiment of the present disclosure. The net system 110 may be used in sports such as tennis, table tennis, volleyball, or badminton. A sports net assembly 117 incorporates a mesh section and a flattened, tubular headband portion affixed to the top of the mesh section. A net support cable 118 may pass through the headband, and net cord loop terminations 112 on each end serve as force-bearing anchor members for the cable to a support post 119 having a net support post cap 116 which functions to guide the cable and to re-direct the applied tension force to be approximately parallel to the net post so that the cable may be anchored to the post or attached to the apparatus. Also shown is a post attachment point 115, which may also be referred to herein as a second force-bearing member, which can be configured as a mount for termination of the system 110.

Example embodiments of apparatuses of the present disclosure are configured to, when attached in-line to a net support cable, indicate the tensile force on a net support cable, which force may be applied by a cable reeling or levered take-up mechanism that is part of an opposite support post in the net system.

FIG. 1B illustrates an apparatus 120 according to an example embodiment of the present disclosure. The apparatus 120 is configured to attach in-line to the net system 110 on one end to a post attachment point at member 115 fixed to the net post 119 by an interface connector (e.g., interface connector 134 through the opening of the attachment loop formed by the flexible material of slidable member 334 in example embodiments of FIG. 3A and FIG. 3C, or eyebolt opening 332 of FIG. 3B). Member 115 can be a hook, bolt, rod, or other means of interfacing an anchoring section (e.g., anchoring section 340 in example embodiment of FIGS. 3A and 341 in example embodiment of FIG. 3B and anchoring sections 340 and 341 in example embodiments of FIGS. 5A and 5B respectively). Sports net assembly 117 typically includes a mesh section, a flattened, tubular headband portion affixed to the top of such mesh, and a net support cable 118 passing through the headband. A net cord loop termination 112 serves as an anchor member for the net support cable 118 to a force-bearing post 119 having a top portion 116 also referred to herein as a net support post cap. The apparatus 120 is configured to, when attached in-line to the net support cable 118 either directly or by an interface connector 134 installed through the opening of the attachment loop formed by the flexible material of slidable member 334 and net cord loop 112, indicate the tensile force on the cable 118.

Figure 2:
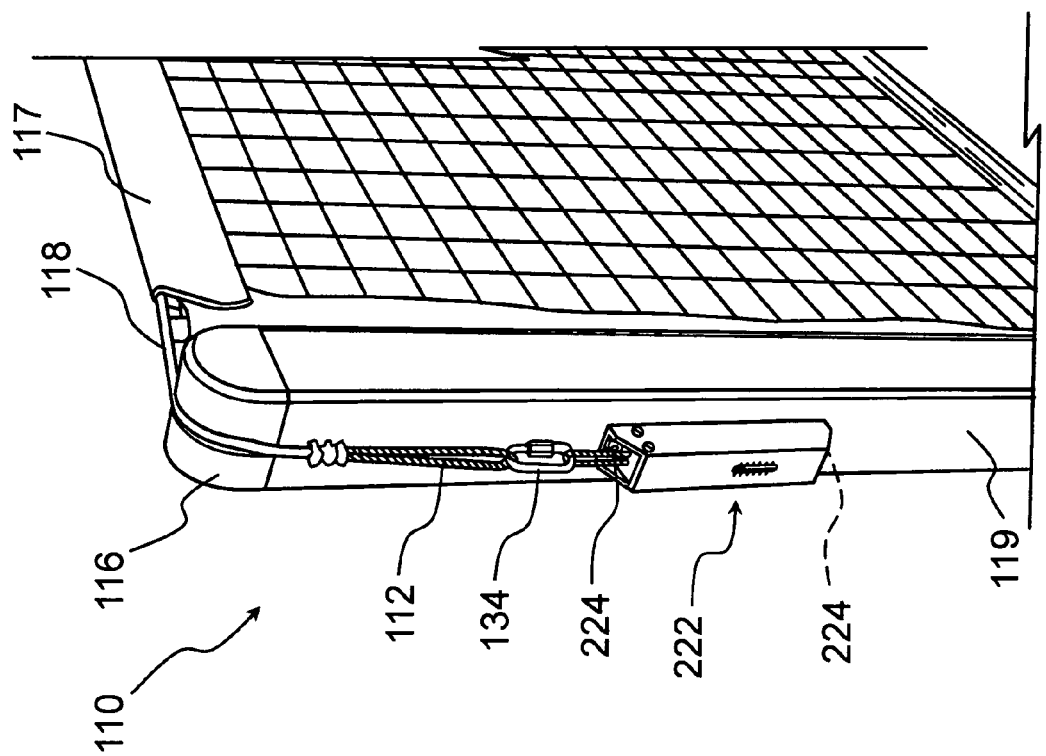
FIG. 2 schematically shows an apparatus according to an example embodiment of the present disclosure, included in a sports net system.

FIG. 2 illustrates an apparatus 222 according to another example embodiment of the present disclosure, implemented in a sports net system 110. A sports net assembly 117 includes a mesh section, a flattened, tubular headband portion affixed to the top of the mesh section, and a net support cable 118 passing through the headband portion. A net cord loop termination 112 serves as an anchor member for the net support cable 118 to a post 119 having a top portion 116, also referred to herein as a net support post cap. The apparatus 222 is configured to be affixed to the post 119 by means of fasteners 224 and to a net cord loop 112 either directly or by an interface connector 134 installed through the opening formed by the flexible material of slidable member 334 and net cord loop 112. The apparatus 222 is configured to, when attached in-line to the net support cable 118, indicate the tensile force on the net support cable 118. In all examples, the tensile force may be applied by a cable reeling or levered take-up mechanism located on one of either net post 119.

Figure 3A:
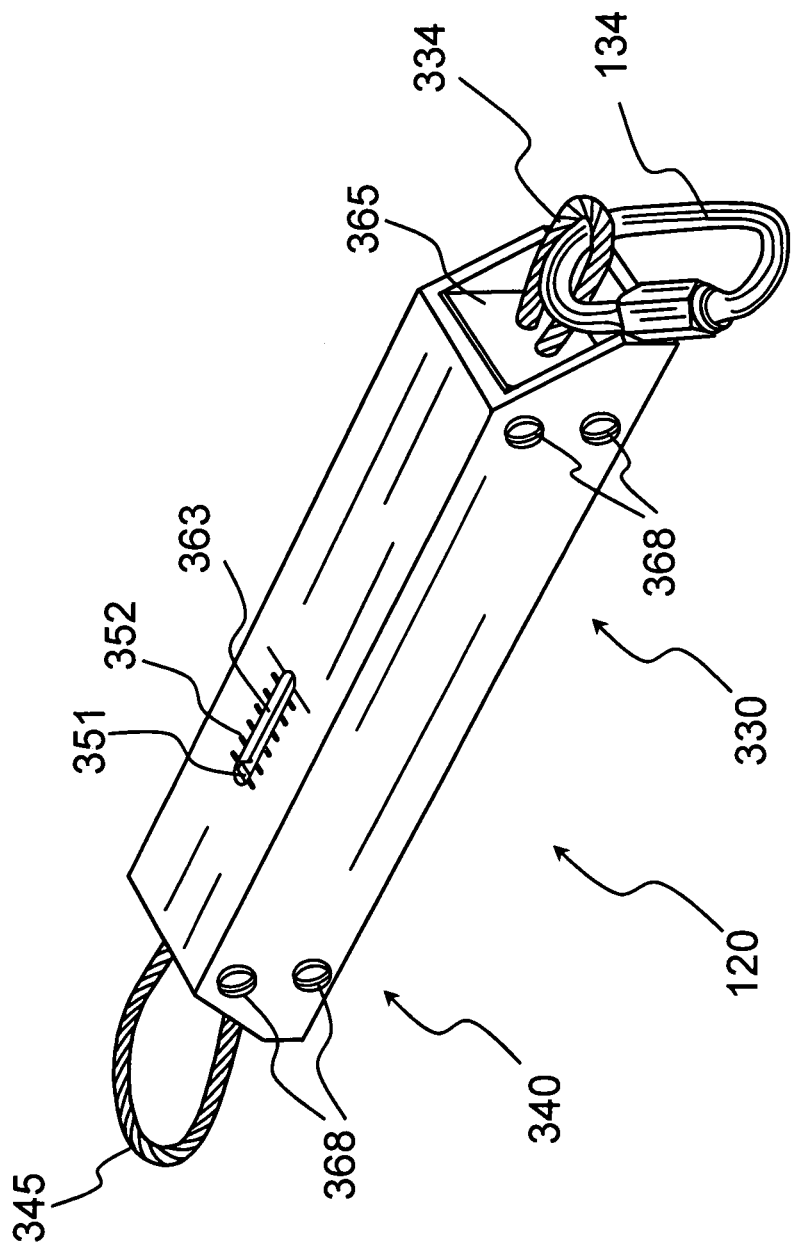
FIG. 3A schematically shows an apparatus according to an example embodiment of the present disclosure, with a flexible attachment member at an anchoring end and slidable, flexible attachment member on a measurement end.

FIG. 3A illustrates an apparatus 120 according to an example embodiment of the present disclosure, with a flexible attachment member upon each of an anchoring end 340 and measurement end 330, according to an example embodiment of the present disclosure. The anchoring end 340 of apparatus 120 is configured with an attachment means and, in particular, a static wire rope loop 345 or rigid element with an integrated loop or hook 348 to interface with support posts (e.g., support post 119 in example embodiment of FIG. 2 that includes a post attachment point 115). The post attachment point may be a welded hook, bolt, cleat, or other attachment fixture having various distance from the outside surface of the post. An end block 365 of the measurement end 330 is configured with a slidable member 334 formed with flexible material such as wire rope or cable to have the dual functionality of bearing the tension force applied to the net support cable and maintaining the application of the force along the longitudinal, central axis of the apparatus (see centerline A in FIG. 5A). Guide holes (see, e.g., FIGS. 5A and 5C) in the measurement section end block 365, through which the slidable member 334 is threaded, are sized to accommodate slip fit of the slidable member 334, and drilled upon locations parallel to and equidistant from the longitudinal center A of the apparatus 120 in order to re-direct any off-parallel tension forces to the longitudinal axis.

Figure 3B:
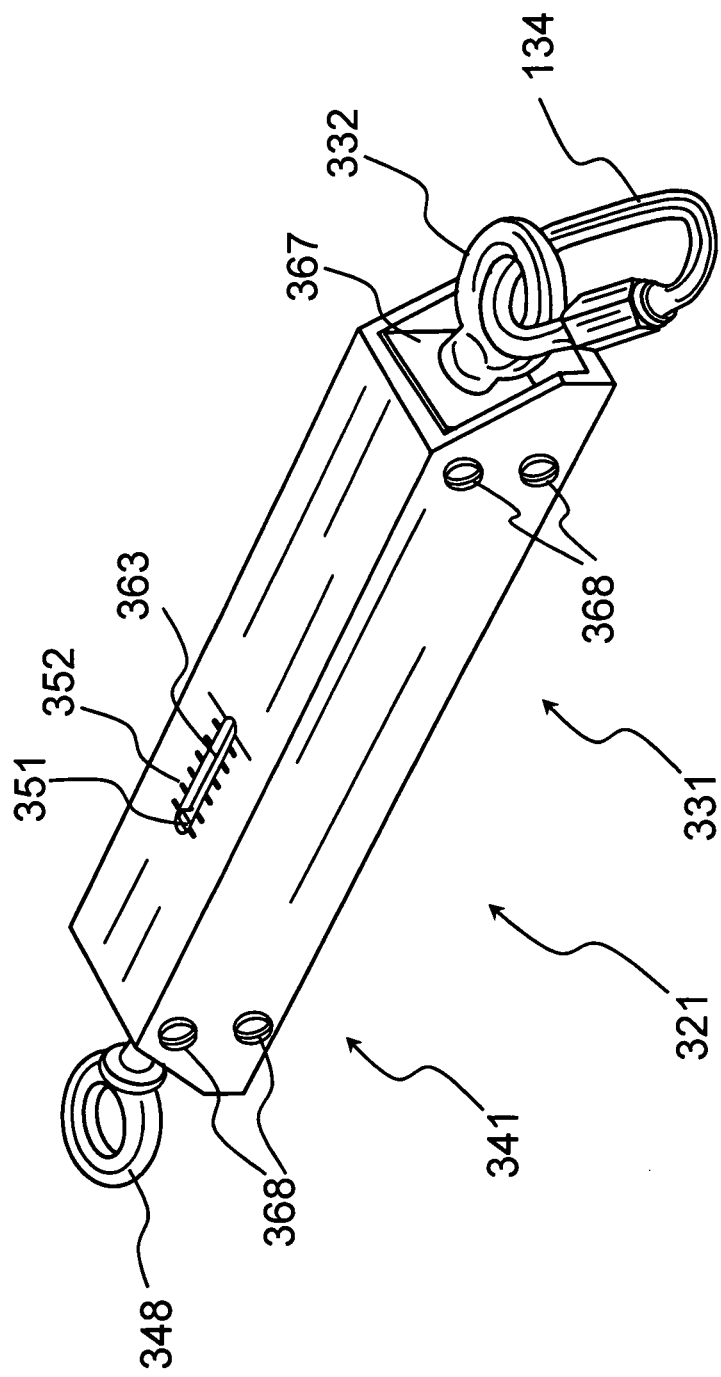
FIG. 3B schematically shows an apparatus according to an example embodiment of the present disclosure, with rigid attachment members upon each end.

FIG. 3B illustrates an apparatus 321 according to an example embodiment of the present disclosure, with an anchoring section 341 configured with rigid attachment means and, in particular, an eyebolt configured to interface with a support post (e.g., support post 119 in example embodiment of FIG. 2) when configured with post attachment point (e.g., post attachment point 115 in example embodiment of FIG. 2). The post attachment point may be a welded hook, bolt, rod, cleat, or other attachment fixture having various distance from the outside surface of the post. Apparatus 321 can have the measurement section 331 alternately configured with a slidable member formed as a rigid means (see, e.g., similar components 546 in exploded view of example embodiment shown in FIG. 5B), which may use one or more of eye bolts, hook bolts, swaged sleeves, and/or unswaged terminations, for example.

Figure 3C:
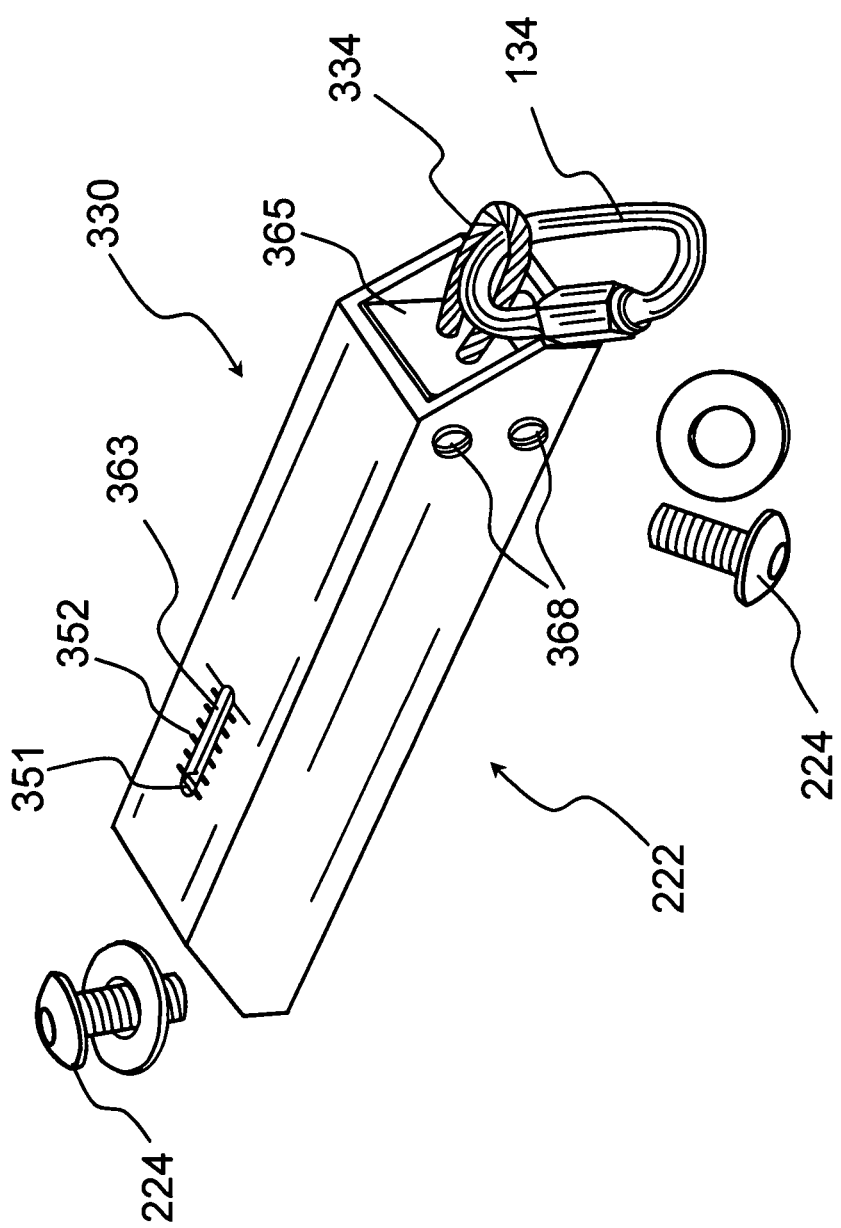
FIG. 3C schematically shows an apparatus according to an example embodiment of the present disclosure, with a slidable, flexible attachment member upon a measurement end and fasteners affixing the apparatus to a sports net support post.

FIG. 3C shows an apparatus 222 according to an example embodiment of the present disclosure, configured to be anchored to a support post (see, e.g., support post 119 in example embodiment of FIG. 2) by direct attachment to the exterior surface of the post using fasteners 224. The fasteners 224 may include shear and tensile strength fasteners such as bolts, screws, and/or rivets. It should be appreciated that a method of attaching the device 222 does not preclude an alternate configuration of measurement section 330 using, for example, a slidable member 334 formed with flexible material or rigid means 546. Although shown in the example embodiments in FIG. 1B, FIG. 2, and FIGS. 3A-3C as a loop fastener with threaded closure barrel, interface connector 134 may alternatively take the form of a hook, loop, shackle, carabiner, spring clip, and/or chain link, depending upon specific interface needs.

Figure 4A:
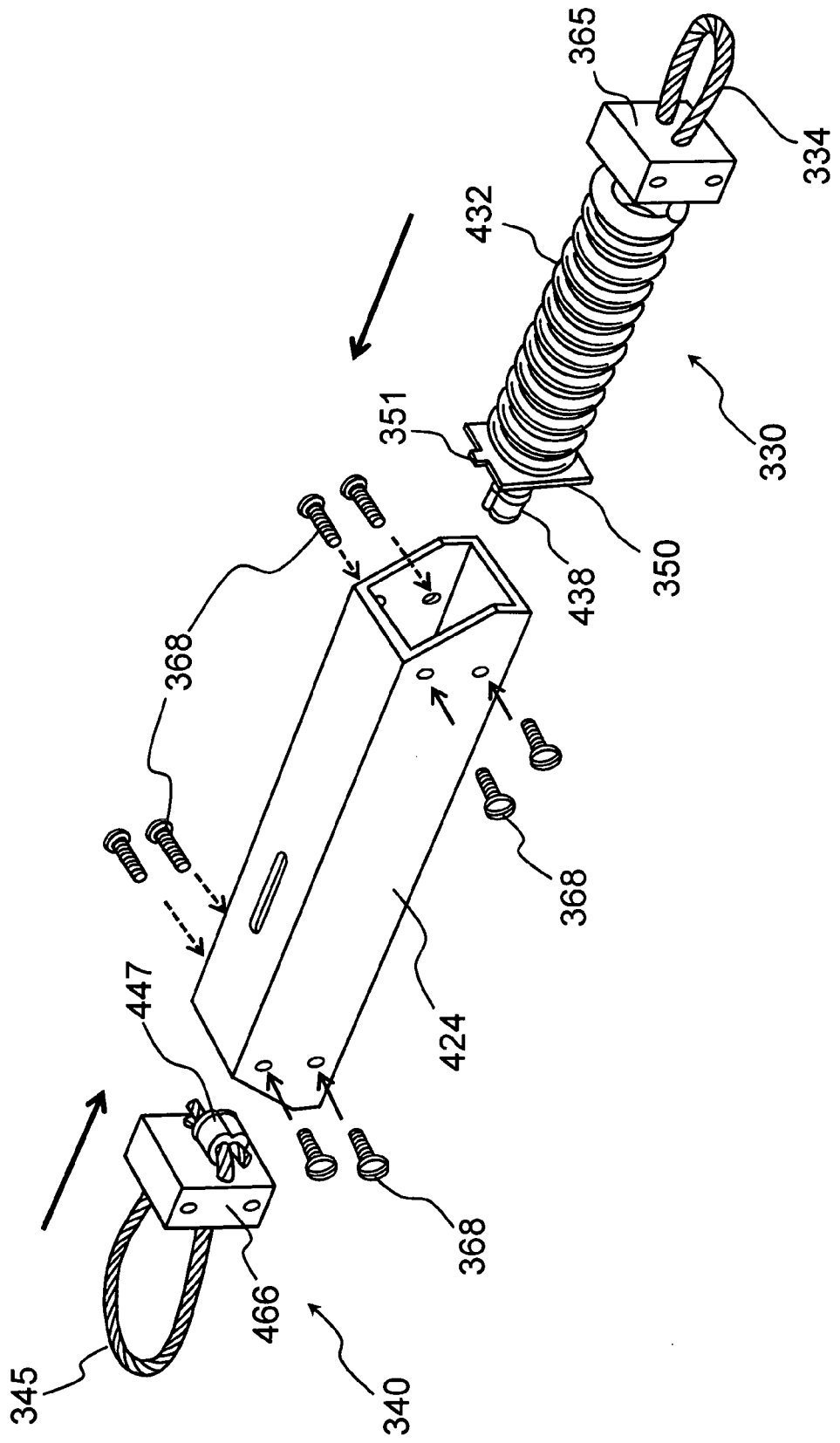
FIG. 4A schematically shows subassemblies of an apparatus according to an example embodiment of the present disclosure, including some components of the example embodiment shown in FIG. 3A.
Figure 4B:
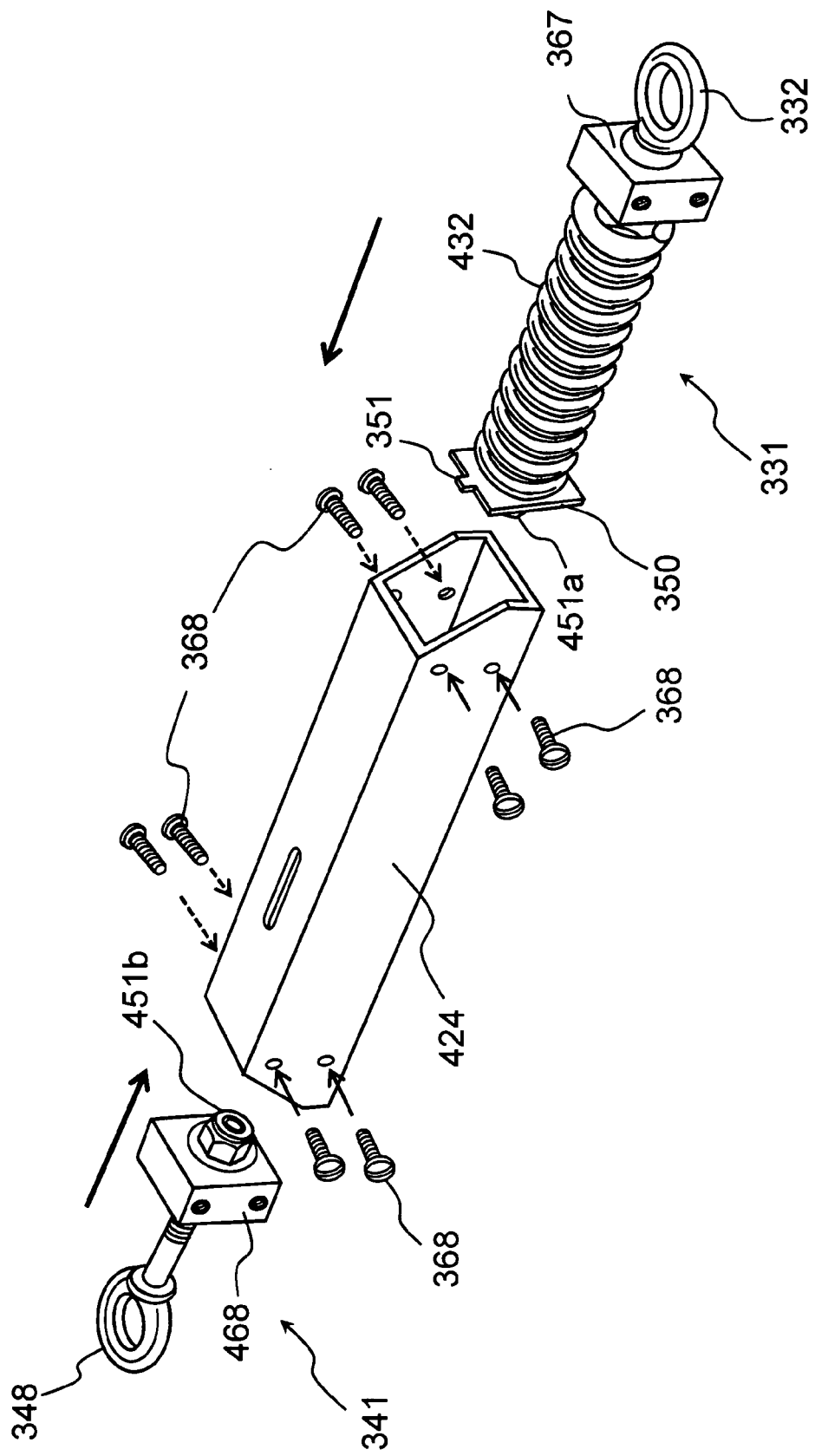
FIG. 4B schematically shows subassemblies of an apparatus according to an example embodiment of the present disclosure, including some components of the example embodiment shown in FIG. 3B.
Figure 4C:
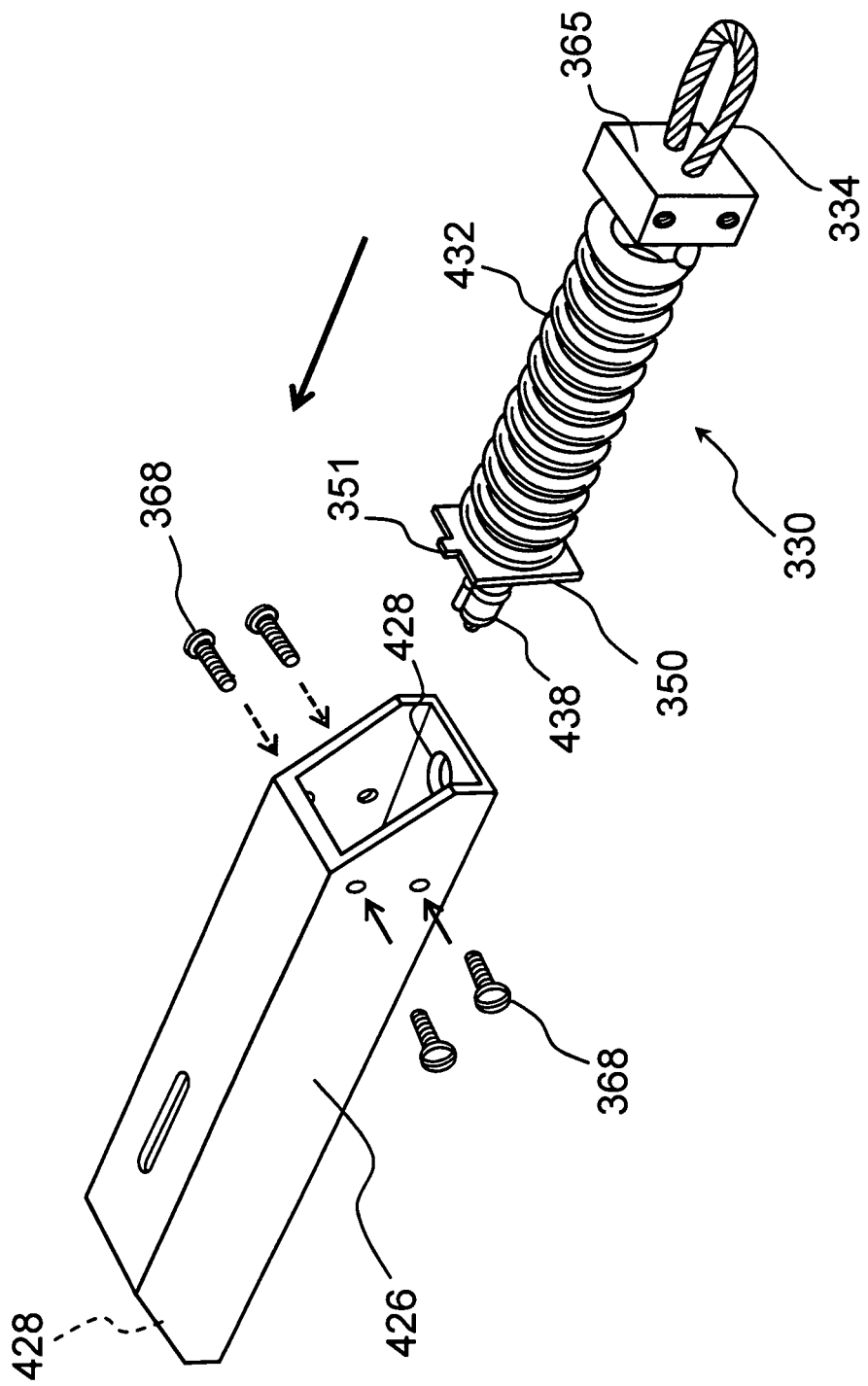
FIG. 4C schematically shows subassemblies of an apparatus according to an example embodiment of the present disclosure, including some components of the example embodiment shown in FIG. 3C.

FIGS. 4A-4C provide exploded subassembly views of three example embodiments of apparatuses according to the present disclosure. In FIG. 4A and FIG. 4B, the measurement end subassembly 330 or 331, including flat centering indicator 350, is inserted into dual-loop housing 424 which is configured to also have anchoring end subassembly 340 or 341 inserted into the opposing end of the dual-loop housing 424, or into direct-mount housing 426 (FIG. 4C and FIG. 2), which is configured to incorporate only measurement end 330 or 331. With the indicating element 351 of flat centering indicator 350 visible through the opening created by slot 363, fasteners 368 such as screws, bolts with nuts, rivets, roll pins, and/or dowel pins are inserted through openings of the housing 424 or housing 426 into holes for that purpose upon measurement section end block 365. FIG. 4A and FIG. 4B also show the anchoring end subassembly 340 or 341 as secured into the housing 224 by fasteners 368 to form the configurations shown in FIG. 3A and FIG. 3B, respectively.

Figure 5A:
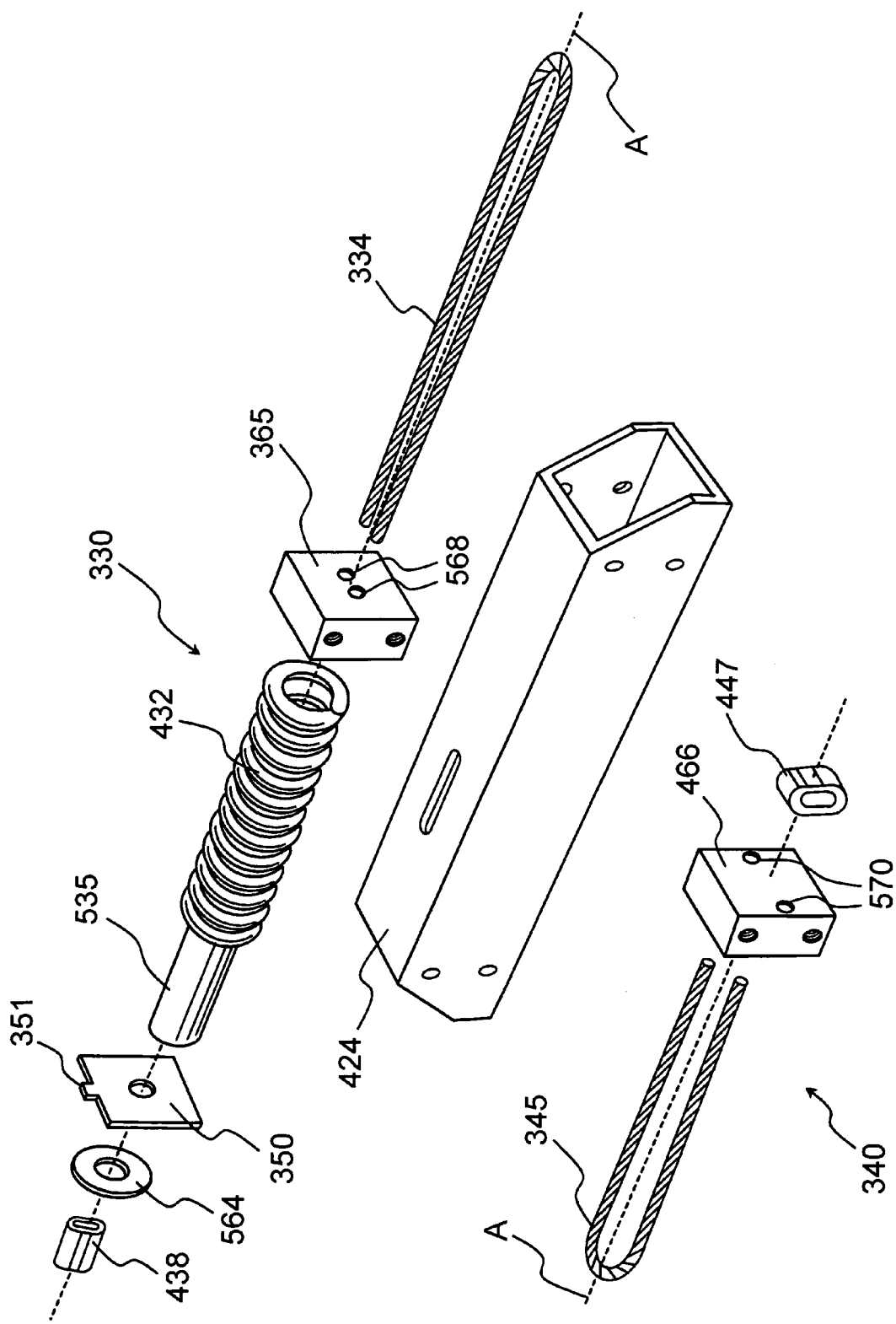
FIG. 5A schematically shows components of an apparatus according to an example embodiment of the present disclosure, including some components of the example embodiments shown in FIGS. 3A and 4A.
Figure 5B:
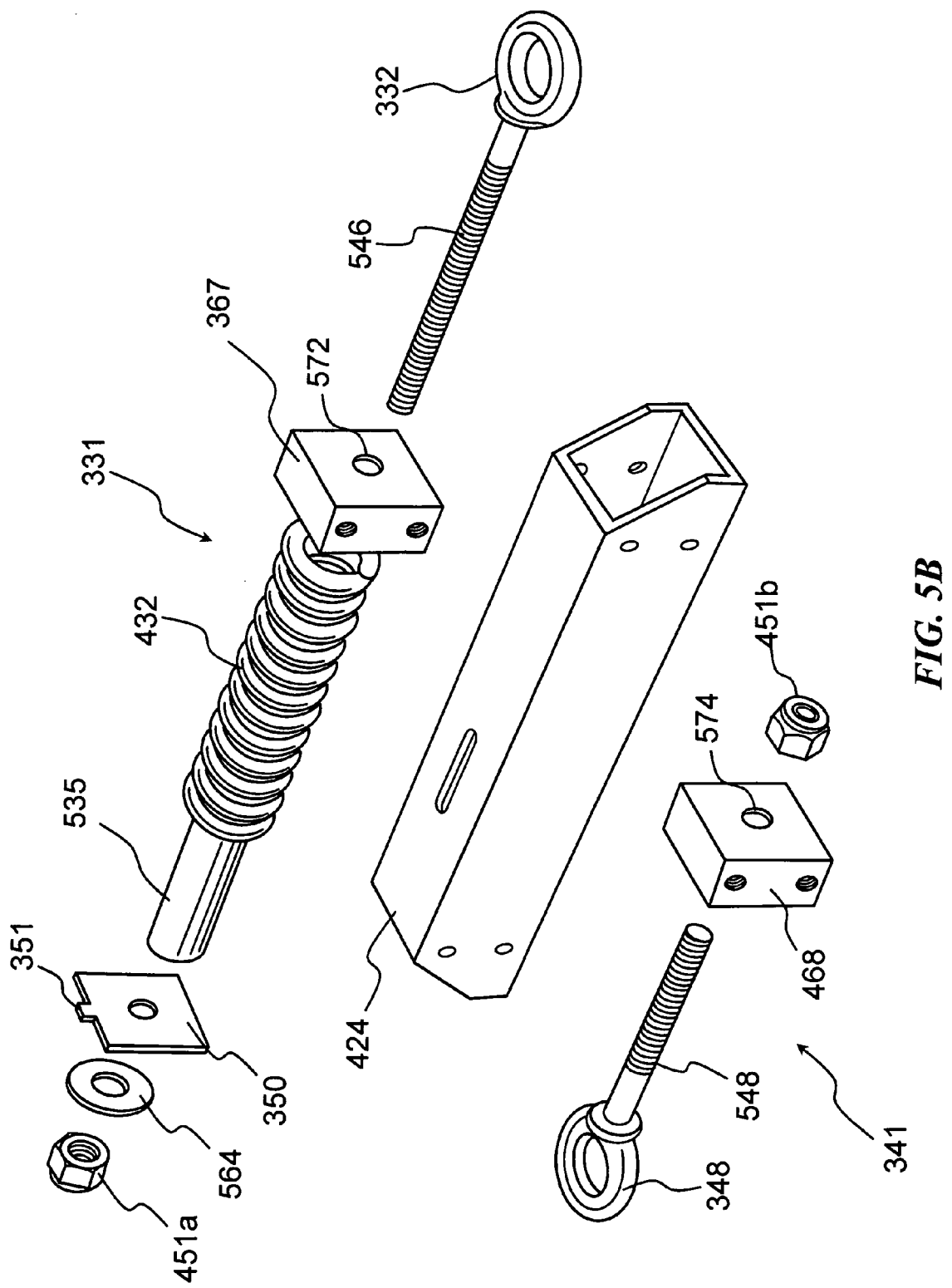
FIG. 5B schematically shows components of an apparatus according to an example embodiment of the present disclosure, including some components of the example embodiments shown in FIGS. 3B and 4B.
Figure 5C:
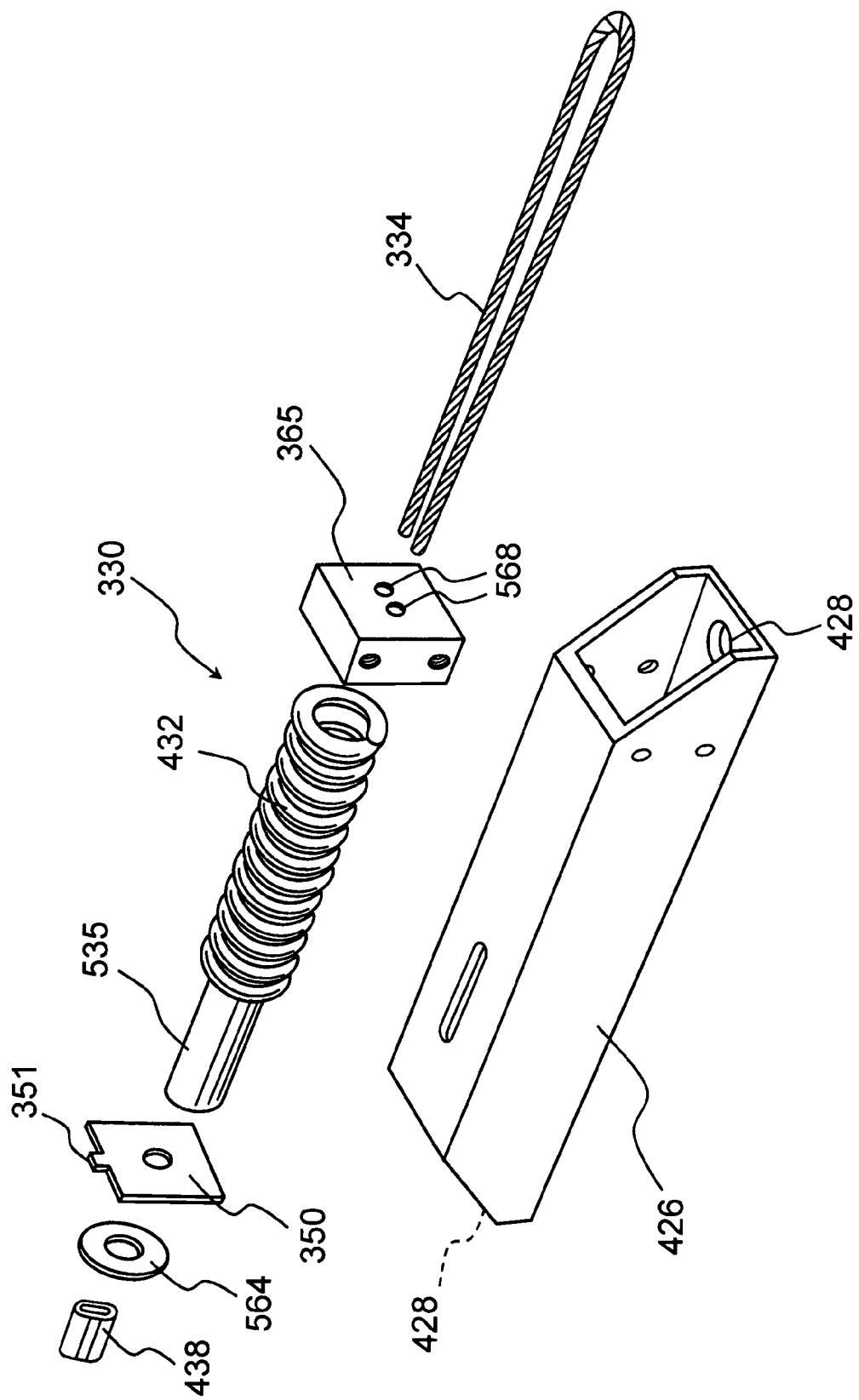
FIG. 5C schematically shows components of including some components of the example embodiments shown in FIGS. 3C and 4C.
Figure 5D:
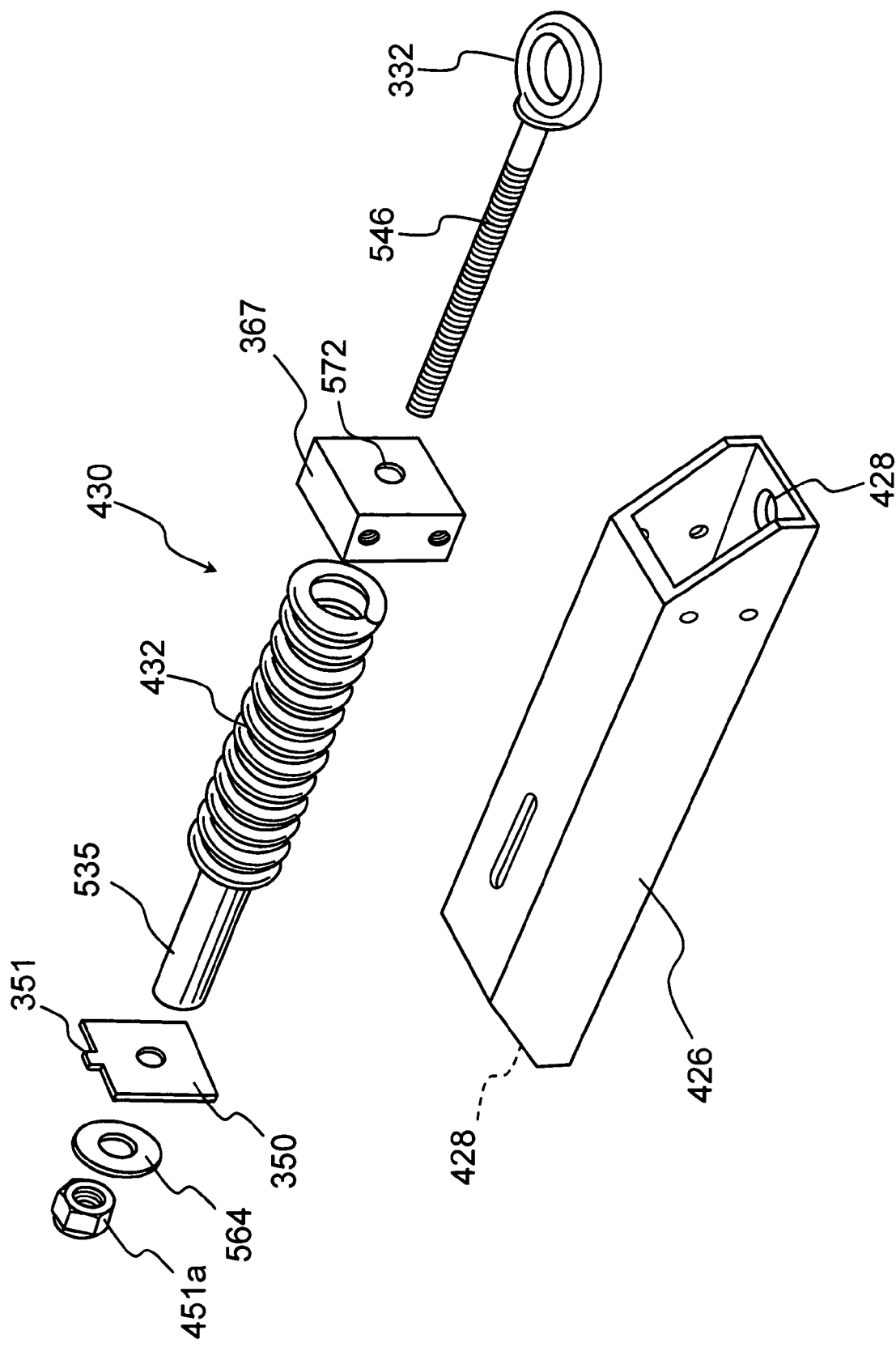
FIG. 5D schematically shows components of an apparatus according to an example embodiment of the present disclosure, including some components of the example embodiments shown in FIGS. 3B, 4B, and 5B, and wherein an attachment member of a measurement end corresponds to a rigid attachment member.

FIGS. 5A-5C illustrate components which can comprise measurement sections 330 or 331, housings 224 and 226, and the anchoring section 340 or 341 according to example embodiments. In FIG. 5A and FIG. 5C, and as shown in subassembly in FIG. 4A and FIG. 4C, respectively, measurement end 330 is configured with slidable member 334 is fabricated from a length of flexible material such as wire rope, rod, cord, or similar. The flexible material of slidable member 334 is folded so as to be formed into generally parallel lengths, each end of which is threaded through holes defined on measurement section end block 365 (see, e.g., 568 FIGS. 5A and 5C) and then passing through the inside diameter of rigid cylindrical sleeve 535, resilient member 432, a hole defined on the center of flat centering indicator 350, and thrust washer 564. The ends of the slidable member 334 are then inserted fully through openings upon clamping means 438, which has the purpose for connecting the ends of the flexible material formed into slidable member 334 and acting as force-bearing component to resilient member 432, acting through flat centering indicator 350 and thrust washer 564. In FIG. 5A, and shown in subassembly in FIG. 4A, flexible material, which is fabricated from a length of material such as wire rope, rod, cord, or similar, is formed into generally parallel lengths, each end of which is threaded through holes drilled upon end block 466, then cross-inserted fully through openings upon clamping means 447, which has the purpose for connecting the ends of the flexible material which has been formed into loop 345 and acting as force-bearing component for end block 466 of the anchoring end 340 when installed into dual-loop housing 224.

Measurement section end block 365 and anchoring section end block 466, when utilized with slidable member 334 for measurement end 330 or flexible material formed into loop 345 in anchoring end 340, have the dual functionality of bearing the tension force applied to the net support cable 118 and maintaining the longitudinally centered application of the force upon the apparatus, in a direction aligned with a central, longitudinal axis of device 120 or device 222 (see, e.g, longitudinal centerline A in FIG. 5A). Guide holes 568 drilled upon measurement section end block 365 through which the flexible material lengths are threaded are specifically located equal radial distance from the radial center of the end block 365 (see, e.g., intersection of longitudinal centerline A with end block 365), spaced apart so that slidable member 334 passes unencumbered through the rigid cylindrical sleeve 535 and resilient member 432, and specifically sized to accommodate slip fit of the flexible material of slidable member 334, to be a guide for the flexible material so that the force applied to the measurement end 330, when configured with the flexible material, if applied in a vector that is not parallel to the longitudinal centerline A will be re-aligned, by the guiding function of the guide holes, to be parallel to the longitudinal central axis.

In FIG. 5B, and shown in subassembly in FIG. 4B, measurement end 331 is configured to include the rigid slidable member 546, which is configured on one end with a loop or hook 332 for the purpose of interfacing with the net loop 112, either directly or through the interface connector 134 installed between attachment loop 332 and net cord loop 112. The shank length of the rigid slidable member 546 is inserted through a single slip-fit hole drilled upon the radial center of end block 367, and passes through the inside diameter of rigid cylindrical sleeve 535, resilient member 432, a hole drilled upon flat centering indicator 350, and thrust washer 564. In the example embodiment shown, threads formed upon the distal end of the rigid slidable member 546 are inserted into a self-locking fastener 451a, which may be selected from a group comprising nylon insert lock nuts, upset-thread lock nuts, jam nuts, or similar.

The self-locking fastener 451a may be positioned on the rigid slidable member 546 to remove end-play by the rigid slidable member 546 without initiating compression of the resilient member 432. FIG. 5B also shows in component view the anchoring end 341 subassembly shown at the left side of FIG. 4B. In this example embodiment, static anchoring loop 348 is shown as one end of a rigid anchoring means 548 which may be selected from a group comprised of eye bolts, hook bolts, swaged sleeves, unswaged terminations, and similar, for the function of interfacing with support post 119 when configured with installed anchoring means 115 that is a bolt or rod protruding from support post 119 such that the interface distance from anchoring end block 468 to static attachment means 348 is not a fixed measurement. The shank length of the rigid anchoring means 548 is inserted through a single slip-fit hole drilled upon end block 468. In the example embodiment shown, threads formed upon the distal end of the rigid anchoring means 548 are inserted into a self-locking fastener 451b, which may be selected from a group comprising nylon insert lock nuts, upset-thread lock nuts, jam nuts, or similar. It should be noted that the end blocks 365, 466, 367, and 468 are each radially sized for slip fit within the open ends of housings 424 and 466, to provide dimensional positioning coaxial with the central longitudinal axis (along centerline A).

In an example operation, each example embodiment is anchored to support post 119 by any configuration of anchoring end 340 of device 120 or anchoring section 341 of device 321 or by the fasteners 224 that attach housing 226 of device 222 to the support post 119. The tension force applied to the net system support cable 118 is transmitted through optional interface connector 134 to the measurement end 330 of device 120 or device 222 or measurement end 331 of device 321. The flexible material of the slidable member 334 or the rigid slidable member 546, passing through the inside diameter of rigid cylindrical sleeve 535, resilient member 432, flat indicator 450, and thrust washer 564, to clamping device 438 or locking device 451a, compress the resilient member a distance proportional to the applied force. Referring to FIGS. 3A-3C, as the resilient member 432 is compressed, flat centering indicator 350, interfaced to the end of the resilient member 432, moves within housing slot 363, and indicates the magnitude of the tension force by the position of indicating element 351 adjacent to the several marks 352 labeled upon housing 224 or housing 226, so positioned to quantify the force.

Rigid cylindrical sleeve 535, additional to the radial centering function provided by its position inside the resilient member 432, is fabricated to a length that provides a fixed limit to the compression of the resilient member, at a compression that preserves the mechanical integrity of the resilient member. That is, the rigid sleeve is configured to have a length that is less than the length of the resilient member when the resilient member is in an uncompressed or partially compressed state, such that the rigid sleeve restricts the resilient member from compressing by an amount greater than a corresponding yield compression of the resilient member in response to an applied force. Those skilled in the art will recognize that the yield compression of a resilient member such as a compression spring refers to the effect on the relaxed length and therefore the spring rate of the compression spring due to forces applied that cause one or more of the spring coils to make contact one with the other; that is, a spring that has been forced beyond a compression length where individual coils make contact has been stressed such that the indicator member would not return to a zero-force indication when relaxed and would indicate incorrect forces when compared to the pre-stress indicator markings.

The foregoing description of the exemplary embodiments has been presented in order to explain aspects of the disclosure and their practical application so as to enable others to utilize aspects of the disclosure according to various embodiments, and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

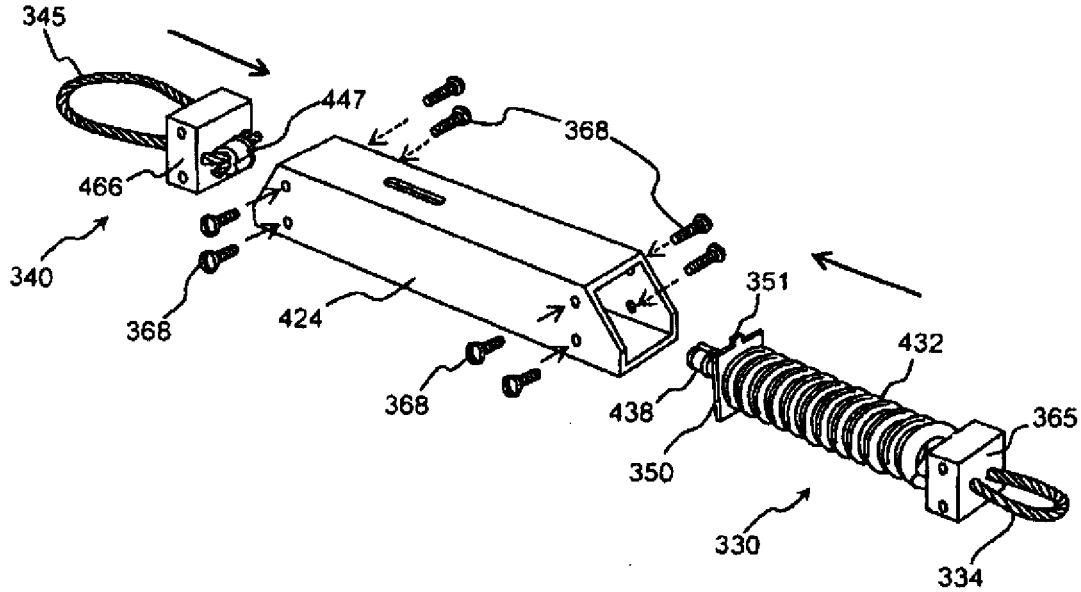

What is claimed is:

1. An apparatus for measuring a tension force on a net cord of a sports net disposed between two opposing static posts, the apparatus comprising:
    a housing having a first end and an opposite second end, and configured to connect to a first one of the static posts;
    a slidable member, comprising flexible cable, having a first end disposed within the housing and passing through a centering indicator, the slidable member further having an opposite, second end extending at least partially outside of the housing through at least one opening defined through an end block at the second end of the housing;
    at least one attachment member disposed proximate the second end of the housing, connected to the slidable member, and configured to engage a portion of the net cord;
    a resilient member retained inside the housing and connected to the slidable member;
    an indicator member connected to the slidable member within the housing; and
    a rigid sleeve having a first end and a second end and a substantially tubular body portion defining a hollow internal passage between the first end and second end, wherein:
        the first end of the rigid sleeve engages the end block and the second end of the rigid sleeve engages the centering indicator,
        the rigid sleeve is disposed longitudinally through a passage defined by the resilient member,
        the flexible cable of the slidable member is received through the hollow internal passage of the rigid sleeve, and
        the rigid sleeve is configured to have a length that is less than the length of the resilient member when the resilient member is in an uncompressed or partially compressed state, and such that the length of the rigid sleeve restricts the resilient member from compressing by an amount greater than a corresponding yield compression in response to an applied force,
    wherein the slidable member is configured to move within the housing in response to and by a distance proportional to an amount of tension force on the net cord as received at the at least one attachment member and relative to an opposing force generated by the resilient member, and
    wherein the indicator member is connected to the slidable member such that at least a portion of the indicator member is exposed through a slotted opening defined in the housing that is different from the at least one opening defined at the second end of the housing.

2. The apparatus of claim 1, wherein the resilient member comprises at least one compression spring.

3. The apparatus of claim 1, wherein the indicator member is configured to move linearly along a slotted opening defined in the housing such as to visually represent the amount of tension force on the net cord.

4. The apparatus of claim 1, further comprising a rigid sleeve configured to prevent the slidable member from moving a distance exceeding a predetermined distance associated with an amount of tension force on the net cord capable of causing mechanical damage to at least one of the net cord, static posts, and resilient member.

5. The apparatus of claim 1, wherein the housing is configured to connect to an external fixed attachment point on the at least one static post.

6. The apparatus of claim 1, wherein the housing comprises scale markings on an external portion of the housing proximate the slotted opening defined in the housing, configured to visually indicate tension force on the net cord corresponding to a distance of movement of the slidable member.

7. The apparatus of claim 1, wherein the at least one attachment member comprises at least one of a loop, carabiner, quick link, chain connector, shackle, clevis, and thimble.

8. The apparatus of claim 1, wherein the housing, cross-sectionally, is substantially circular or rectangular.

9. An apparatus for measuring a tension force on a net cord of a sports net disposed between two opposing static posts, the apparatus comprising:
    a housing having a first end and an opposite second end, and configured to be fixedly attached to an external portion of the at least one static post;
    fasteners configured to fix the housing directly to the external portion the first static post;
    a slidable member, comprising flexible cable, having a first end disposed within the housing and passing though a centering indicator, the slidable member further having an opposite, second end extending at least partially outside of the housing through at least one opening defined through an end block at the second end of the housing;
    at least one attachment member disposed proximate the second end of the housing, connected to the slidable member, and configured to engage a portion of the net cord proximate the first static post;
    at least one compression spring retained inside the housing and connected to the slidable member;

an indicator member connected to the slidable member within the housing; and a rigid sleeve having a first end and a second end and a substantially tubular body portion defining a hollow internal passage between the first end and second end, wherein:

the first end of the rigid sleeve engages the end block and the second end of the rigid sleeve engages the centering indicator, the rigid sleeve is disposed longitudinally through a passage defined by the resilient member, the flexible cable of the slidable member is received through the hollow internal passage of the rigid sleeve from the first end to the second end, and the rigid sleeve is configured to have a length that is less than the length of the resilient member when the resilient member is in an uncompressed or partially compressed state, and such that the rigid sleeve restricts the resilient member from compressing by an amount greater than a corresponding yield compression in response to an applied force, wherein the slidable member is configured to move within the housing in response to and by a distance proportional to an amount of tension force on the net cord as received at the at least one attachment member and relative to an opposing force generated by the at least one compression spring, and wherein the indicator member is connected to the slidable member such that at least a portion of the indicator member is exposed through a slotted opening defined in the housing that is different from the at least one opening defined at the second end of the housing.

10. The apparatus of claim 9, wherein the slotted opening defined in the housing is defined as a substantially linear slot and the indicator member is configured to move linearly along the slotted opening such as to visually represent the amount of tension force on the net cord.

11. The apparatus of claim 9, further comprising a rigid sleeve configured to prevent the slidable member from moving a distance exceeding a predetermined distance associated with an amount of tension force on the net cord capable of causing mechanical damage to at least one of the net cord, static posts, and resilient member.

12. The apparatus of claim 9, wherein the housing comprises scale markings on an external portion of the housing proximate the slotted opening defined in the housing, configured to visually indicate tension force on the net cord corresponding to a distance of movement of the slidable member.

13. An apparatus for measuring a tension force on a net cord of a sports net disposed between two opposing static posts, the apparatus comprising:

a housing having a first end and an opposite second end;

a first at least one attachment member disposed proximate the first end of the housing, configured to attach to an external portion of a first one of the two static posts;

a slidable member having a first end disposed within the housing and an opposite, second end extending at least partially outside of the housing through at least one opening defined at the second end of the housing;

a second at least one attachment member disposed proximate the second end of the housing, connected to the slidable member, and configured to engage a portion of the net cord proximate the first static post;

at least one compression spring retained inside the housing and connected to the slidable member;

an indicator member connected to the slidable member within the housing, wherein the slidable member is configured to move within the housing in response to and by a distance proportional to an amount of tension force on the net cord as received at the second at least one attachment member and relative to an opposing force generated by the at least one compression spring, and wherein the indicator member is connected to the slidable member such that at least a portion of the indicator member is exposed through a slotted opening defined in the housing that is different from the at least one opening defined at the second end of the housing; and an end block at the second end of the housing, having guide holes defined therethrough, wherein the flexible cable of the slidable member is threaded through the guide holes, and wherein the guide holes, as defined through the end block, are oriented such that the tension force on the net cord, as received by the at least one attachment member, is applied to the at least one compression spring in a direction that is aligned with a central, longitudinal axis of the apparatus.

14. The apparatus of claim 13, wherein the slotted opening defined in the housing is defined as a substantially linear slot and the indicator member is configured to move linearly along the slotted opening such as to visually represent the amount of tension force on the net cord.

15. The apparatus of claim 13, further comprising a rigid sleeve configured to prevent the slidable member from moving a distance exceeding a predetermined distance associated with an amount of tension force on the net cord capable of causing mechanical damage to at least one of the net cord, static posts, and resilient member.

16. The apparatus of claim 13, wherein the at least one attachment member is configured to attach to an external fixed attachment point on the first static post.

17. The apparatus of claim 13, wherein the housing comprises scale markings on an external portion of the housing proximate the slotted opening defined in the housing, configured to visually indicate tension force on the net cord corresponding to a distance of movement of the slidable member.

18. The apparatus of claim 13, wherein the at least one attachment member comprises at least one of a loop, carabiner, quick link, chain connector, shackle, clevis, and thimble.

19. The apparatus of claim 13, wherein the guide holes of the end block at the second end of the housing are defined at locations on the end block that are spaces an equal distance apart from a radial center of the end block.

* * * * *

UNITED STATES PATENT AND TRADEMARK OFFICE
CERTIFICATE OF CORRECTION

| | | |
|---|---|---|
| PATENT NO. | : 8,806,952 B1 | |
| APPLICATION NO. | : 13/549513 | |
| DATED | : August 19, 2014 | |
| INVENTOR(S) | : David Ewing Glass | |

It is certified that error appears in the above-identified patent and that said Letters Patent is hereby corrected as shown below:

Delete the title page and substitute the attached title page therefor.

Signed and Sealed this
Third Day of February, 2015

Michelle K. Lee
*Deputy Director of the United States Patent and Trademark Office*

CERTIFICATE OF CORRECTION (continued)

(12) United States Patent
Glass

(10) Patent No.: US 8,806,952 B1
(45) Date of Patent: Aug. 19, 2014

(54) MEASURING SPORTS NET TENSION

(76) Inventor: David Ewing Glass, Knoxville, TN (US)

(*) Notice: Subject to any disclaimer, the term of this patent is extended or adjusted under 35 U.S.C. 154(b) by 134 days.

(21) Appl. No.: 13/549,513

(22) Filed: Jul. 15, 2012

Related U.S. Application Data

(60) Provisional application No. 61/507,854, filed on Jul. 14, 2011.

(51) Int. Cl.
*G01N 3/08* (2006.01)

(52) U.S. Cl.
USPC .................................. 73/826; 177/232

(58) Field of Classification Search
CPC ........ G01L 1/042; G01L 1/046; G01G 3/02; G01G 3/06
USPC ................... 73/760, 828, 831; 177/232
See application file for complete search history.

(56) References Cited

U.S. PATENT DOCUMENTS

| | | | |
|---|---|---|---|
| 3,824,847 A * | 7/1974 | Chambers | 73/132 |
| 5,691,510 A * | 11/1997 | Turman | 177/225 |
| 6,246,017 B1 * | 6/2001 | Yang | 177/148 |
| 6,248,030 B1 | 6/2001 | Pierce | |
| 6,766,698 B1 * | 7/2004 | Robinson et al. | 73/856 |
| 6,945,471 B2 * | 9/2005 | McKenzie et al. | 239/237 |
| 7,009,120 B2 * | 3/2006 | Lee | 177/232 |
| 7,165,295 B2 * | 1/2007 | DeWitt et al. | 24/132 WL |
| 7,717,877 B2 * | 5/2010 | Lavi et al. | 604/137 |
| 7,823,466 B2 * | 11/2010 | Glass | 73/862.392 |

* cited by examiner

*Primary Examiner* — Max Noori

(57) ABSTRACT

In one aspect, an apparatus for measuring a tension force on a net cord of a sports net is disclosed. The apparatus may include a housing configured to connect to a static post. The apparatus may also include a slidable member and attachment members. The attachment members may be configured to engage a portion of the net cord. A resilient member inside the housing may be connected to the slidable member, and an indicator member may be connected to the slidable member within the housing. The slidable member may be configured to move within the housing in response to and by a distance proportional to an amount of tension force on the net cord. The indicator member may be connected to the slidable member such that a portion of the indicator member may be exposed through a slotted opening defined in the housing.

19 Claims, 13 Drawing Sheets